Patented July 11, 1939

2,165,378

UNITED STATES PATENT OFFICE 2,165,378

VACUUM DISTILLATION

Kenneth C. D. Hickman, Rochester, N. Y., assignor, by mesne assignments, to Distillation Products, Inc., Rochester, N. Y., a corporation of Delaware No Drawing. Application February 15, 1936, Serial No. 64,178

8 Claims. (Cl. 202—52)

This invention relates to improvements in high vacuum distillation processes and more particularly to improvements in processes of molecular distillation.

Processes of high vacuum distillation are well known and have been applied to the distillation and purification of various materials. Thus, Burch United States Patent 1,955,321 discloses the molecular distillation of hydrocarbon oils and in my United States Patents 1,925,559 and 1,942,858 I have disclosed the similar distillation of vegetable and animal oils, fats, and waxes in order to concentrate therapeutic agents contained therein. Processes of high vacuum distillation have been applied to the treatment of numerous other types of materials such as sterols, hormones, etc. The materials so treated are often of a viscous character of high molecular weight and therefore do not flow with sufficient rapidity through the still. This results in overheating and decomposition of valuable constituents and is especially disastrous when materials containing heat sensitive substances such as vitamins are treated. Often the materials to be distilled contain dissolved substances which are thrown out of solution on distillation of part of the solvent and this material deposits on the heated evaporating surface where it continues to collect resulting in clogging of the apparatus. Where the constituents of the mixture to be distilled boil at nearly the same temperature the entire liquid may evaporate leaving a deposit of non-volatile residue on the evaporating surface. As the evaporating and condensing surfaces are arranged in close proximity the deposit cannot be effectively removed unless the whole still is dismantled which, involves considerable loss in time and expense. A clean evaporating surface is important for efficient distillation and it has been necessary until the advent of my invention, to periodically dismantle the still and mechanically remove deposited materials.

This invention has for its object to overcome the deficiencies of hitherto known vacuum distillation processes and to provide a process whereby viscous materials or materials tending to deposit solid substances can be distilled without clogging of the distillation apparatus. A further object is to provide a process whereby viscous materials may be subjected to molecular distillation without deposition of solids or decomposition products on the evaporating surface and without decomposition of heat sensitive materials contained therein. A still further object is to provide a process enabling the high vacuum distillation of mixtures, the constituents of which boil at nearly the same boiling point, without the deposition of non-volatile residues. Other objects will appear hereinafter.

These objects are accomplished by the following invention which in its broader aspects comprises adding to the mixture to be high vacuum distilled a liquid having a lower vapor pressure, under the conditions of operation, than the fraction which is to be vaporized from the mixture. In this way the distilland can be rapidly circulated through the still and sufficient liquid will remain in the distilland to prevent deposition of residues on the surface.

In the following examples and description I have set forth several of the preferred embodiments of my invention, but it is to be understood that they are included merely for purposes of illustration and not as a limitation thereof.

In subjecting a material of high viscosity or having a tendency to precipitate solids to high vacuum distillation a liquid is first added which has a lower vapor pressure under the conditions of distillation than the fraction which is to be obtained as a distillate. For best results a liquid should be selected which is miscible with the distilland since the precipitation of solids will be more effectively prevented. However, non-miscible or partially miscible liquids may be used since they dissolve precipitated solids or will mechanically entrain and remove precipitated solids which are not soluble therein. The selection of the liquid agent obviously depends upon the character of the particular distilland and the vapor pressure of the distillate to be removed. Where the distillate has a relatively low vapor pressure the liquid need not have an excessively low volatility. It is important however to select a liquid which has a lower vapor pressure than the distillate or it will also distill giving no beneficial results as far as the removal of solids is concerned. Preferably a liquid is employed which has a considerably lower vapor pressure than the distilland especially where contamination of the distillate by the entraining agent is undesirable.

In speaking of substances having a relatively high or low volatility it is to be understood that this invention relates to high vacuum distillation and in such processes materials generally recognized as being of low volatility are usually distilled and that the comparison is between substances of this class and that the expressions therefore, do not have the meaning generally given them by a chemist. Thus, in distilling a substance such as propylene glycol which has a relatively high volatility in the field of high vacuum distillation, a liquid having a lower vapor pressure such as triphenyl phosphate may be employed to prevent deposition. The phosphate has a vapor pressure which is also rather high, but is sufficiently low to enable distillation of the glycol without substantial contamination. In distilling glycerides such as natural vegetable and animal oils substantially no residue is left to carry away dissolved solids and protein matter. As glycerides have a low volatility it is necessary to add liquid agent which has a very low vapor pressure. The particular agent selected depends upon the nature of the glyceride or oil to be treated and where the glyceride to be distilled is of rather high volatility as compared with other glycerides the latter may be used as the liquid agents. Thus, in distilling linseed, salmon or cottonseed oil, a glyceride of very low volatility such as castor oil may be added.

Instead of using a foreign liquid it is often convenient to use the lowest vapor pressure portion of the oil which is to be distilled. Most natural oils contain a small quantity of extremely non-volatile liquid residue. If this residue passes too slowly over the heated surface of the still it may dry down in spite of its low volatility or it may decompose or polymerize. By increasing the rate of travel through the still especially at the hottest portions this non-volatile residue mixed with constituents which it is desired to volatilize can be easily withdrawn and partially or entirely returned to some previous position or stage of the still. It may thus be added to the original oil to be distilled or to the hot columns which it is desired to protect. In this way any desired proportion of non-volatile liquid may be accumulated and recirculated.

The difference required between the vapor pressure of the added liquid and that of the distillate depends upon the results which it is desired to obtain. If there is no objection to contamination of the distillate the difference may be slight and an excess of the liquid agent added to assure its presence in the distilland in amounts sufficient to accomplish its purpose. Where it is desirable to have substantially no contamination of the distillate it is essential to employ a liquid which has a vapor pressure considerably lower than that of the fraction to be removed as distillate.

The proportions of liquid agent used are not critical and may be several times the weight of the distilland or only a fraction thereof depending upon the physical characteristics of the material to be distilled, the amount of solids dissolved therein and their tendency to precipitate, and upon the amount of the distilland which is to be removed as distillate tendency to polymerize etc. Where the distilland is viscous and contains a high proportion of dissolved solid or gelatinous material, a higher proportion must be used such as equal proportions, or in some cases 2, 5 or as high as 25 parts or more of liquid to 1 of distilland. The same is true where substantially all of the liquid portion of the distilland is to be removed as distillate. Lower proportions such as about .5 to 50% are satisfactory in cases where the material treated is of low viscosity and/or little of it is to be removed as distillate. It is emphasized that the proportions vary according to the nature of the distilland and that proportions cannot therefore be empirically defined. However, anyone skilled in the art can, by following the directions given, apply the principles of my invention to any particular material under consideration.

Where heating of the distillate causes deposition of solids a solvent for the solids may be employed as the liquid agent. This expedient being effective even where there is normally a considerable portion of the distilland remaining as undistilled liquid.

The liquid agent employed may be separated from the distilland and reused any desired number of times. In order to make this separation easier it is often desirable to employ a liquid which is immiscible with the distilland at ordinary or sub-normal temperatures, but is miscible therewith at the temperature of distillation. Such a liquid can be separated from the distilland for reuse by the simple expedient of cooling and separation of the two layers of liquid thus formed.

*Example*

Linseed oil is subjected to molecular distillation at temperatures between 150° C. and 225° C., four fractions being withdrawn at successively higher temperatures, the first and second fractions each representing 10%, the third 30% and the final fraction all but 5% of the oil. It is found that the remaining 5% will not spread evenly over the heated columns of the still and that it gathers into local streams where it polymerizes and dries down to a hard varnish. The rate of flow is increased and a relatively large quantity (10–30%) of viscous undistilled oil is withdrawn from the bottom of the last column and is pumped up and admixed with oil from the previous stages which is entering this column. Five percent of this viscous oil coming from the bottom of the last column is led to waste. Distillation of all but 5% of the original oil is thus achieved and yet a quantity equal to 10–30% of the original oil is maintained in rapid and satisfactory circulation over the last column on which the deposition of solids is greatly diminished.

The process of my invention is especially applicable to those distillation processes which occur under such high vacuum conditions that a high proportion of the vaporized molecules do not return to the evaporative surface and are condensed upon a surface located in close proximity to the evaporating surface. This distance is usually of the order of, or less than the mean free path of the molecules of residual gas, however, very useful results can be obtained using distances of several times this amount if a rapid renewal of the evaporating surface is maintained. In such a case the distillate is carried to the condensing surface at least in part by convection.

Those processes employing a distance of less than about the mean free path are processes of molecular distillation. Such processes can conveniently be carried out in the apparatus disclosed in my United States Patent 1,942,858 although it is obvious that any other types of molecular distillation apparatus may be used. The materials to be distilled are preferably first degassed after addition of the entraining liquid either in the manner disclosed in my patent referred to, or in my patent application No. 48,691 filed November 6, 1935. However, this mode of treatment is unnecessary and the material to be distilled may be entirely run into a distillation chamber and degassed and distilled therein, or the distilland can be admitted relatively slowly directly into the distillation chamber, the chamber being provided with large ducts and high vacuum pumps to withdraw the air and gases and easily volatilizable materials contained therein. By this latter method the withdrawal of gases, etc., is accomplished so rapidly that the pressure of the residual gas in the vessel during distillation is substantially the same as when the degassing step is carried out in a separate chamber. In a preferred method I pass the material to be distilled a number of times through the still or through a number of successive stills and each time I raise the temperature and/or lower the pressure so as to remove successively less and less volatile constituents.

In molecular distillation processes a low pressure usually less than .1 mm. is employed, resulting in an appreciable mean free path. Pressures of less than about .01 mm. such as for instance, about .001 mm. to .0001 mm. are preferred. However, as the mean free path is inversely proportional to the pressure it is apparent that the higher the degree of vacuum, the greater will be the rate of distillation. It is therefore possible to use evaporating and condensing surfaces situated within one inch at a residual operating pressure of less than 3 microns or without a quarter of an inch at less than 8 microns, or within 10 inches at less than .3 micron and so forth. With pressure and distance as interchangeable quantities in molecular distillation no real lower limit to the pressure or upper limit to the distance can be defined, but for reasons of expediency it is preferable not to operate with a residual gas pressure of less than .01 micron or a distance of greater than 10 ft. Distances of less than about 10 inches such as ½ inch to 6 inches have been found to be most suitable.

In selecting the temperatures to be used in high vacuum and especially molecular distillation processes consideration must be given to the character of the material to be distilled and the pressures used. Materials of very low volatility must be heated to temperatures approaching their decomposition point even though the lowest pressures attainable are employed. With such compounds temperatures as high as 325° C. are useful. On the other hand the separation of easily volatizable compounds can be effected at low temperatures such as at room temperatures or slightly higher such as up to about 70° C. Most materials have vapor pressures intermediate these two extreme types and they may be satisfactorily distilled at temperatures of 70° to 300° C. and usually at lower temperatures of between 70° and 250° C. The latter range and especially those temperatures between 90° and 230° C. have been found to be most satisfactory for the distillation of vitamins from vitamin containing oils.

While I have described my invention as being especially applicable to processes of molecular distillation it is applicable to other processes of high vacuum distillation where a troublesome problem in circulation of the distilland and clogging of apparatus is encountered. My invention is, however, especially useful in processes of molecular distillation since the evaporating surfaces are necessarily very large and it is important to distribute the distilland thereon in a thin layer.

The materials used as liquid agents may be any organic compounds or mixtures thereof which have the requisite physical properties as regards vapor pressure, and viscosity. Thus glycerides such as castor oil, and olein, phthalates such as benzyl, buty, amyl, and octyl phthalates, alcohols such as mono, di and tri glycerol, esters such as triacetin, methyl oleate, and stearate, high boiling hydrocarbons such as lubricating oil, "Apieson" oils, etc., may be employed. Obviously no liquid should be selected which has a high viscosity or decomposes at the temperature at which it is employed.

The process of my invention is applicable to the high vacuum distillation of any materials which have a high viscosity or tendency to deposit solids on the evaporating surface. Examples of materials to which the invention has been applied, in addition to those given above are the distillation of high boiling hydrocarbons and viscous or tar forming fractions thereof; crude animal and vegetable oils, fats and waxes, such as linseed, walnut, menhaden, cottonseed, wheat germ, salmon, cod-liver, herring, halibut, mackerel, etc., to recover unsaturated glycerides and/or therapeutic agents such as fat soluble vitamins and sterols; crude germinal gland hormone concentrates and synthetic reaction mixtures containing them, and natural oils containing large amounts of dissolved solids such as soya been oil.

It is to be understood that the term liquid designates normally liquid materials as well as those materials which are liquid at the temperature of the still such as normally viscous liquids or solids which readily flow at the temperatures employed.

The herein described process affords an economical, simple and effective solution of the vexatious problem of preventing deposited solids from clogging or lowering the efficiency of a high vacuum still. By means of my invention viscous and deposit forming materials may be rapidly run through a molecular still and evenly spread in a thin layer over the evaporating surface without thermal decomposition or deposition of solids.

I claim:

1. The process of distilling a liquid substance which contains no added solid matter and which deposits non-volatile viscous or solid residue during high vacuum distillation while in the form of a thin film which process comprises, adding to this liquid substance to be distilled an organic, freely flowing liquid which has a lower vapor pressure than the fraction to be separated and which is miscible with the liquid substance to be distilled, subjecting this mixture to distillation by flowing it in the form of a thin film over a heated vaporizing surface, condensing the distillate upon a condensing surface which is located in close proximity to the vaporizing surface and maintaining a high vacuum in the space between the vaporizing and condensing surfaces during the distillation.

2. The process of distilling a liquid substance which contains no added solid matter and which deposits non-volatile viscous or solid residue during high vacuum distillation while in the form of a thin film which process comprises, adding to this liquid substance to be distilled an organic, freely flowing liquid which has a lower vapor pressure than the fraction to be separated and which is miscible with the liquid substance to be distilled, subjecting this mixture to distillation by flowing it in the form of a thin film over a heated vaporizing surface, condensing the distillate upon a condensing surface which is located in close proximity to the vaporizing surface and maintaining a pressure of less than about .1 mm. of mercury in the space between the vaporizing and condensing surfaces during the distillation.

3. The process of distilling a liquid substance which contains no added solid matter and which deposits non-volatile viscous or solid residue during high vacuum distillation while in the form of a thin film which process comprises, adding to this liquid substance to be distilled an organic, freely flowing liquid which has a lower vapor pressure than the fraction to be separated and which is miscible with the liquid substance to be distilled, subjecting this mixture to distillation by flowing it in the form of a thin film over a vaporizing surface heated to a temperature of between about 70° and 250° C., condensing the distillate upon a condensing surface which is located in close proximity to the vaporizing surface and maintaining a pressure of less than about .01 mm. of mercury in the space between the vaporizing and condensing surfaces during the distillation.

4. The process of distilling a vegetable or animal oil which deposits non-volatile residue during high vacuum distillation while in the form of a thin film which comprises adding to the substance to be distilled an organic, freely flowing liquid which has a lower vapor pressure than the fraction to be separated and which is miscible with the oil, subjecting this mixture to distillation by flowing it in the form of a thin film over a heated vaporizing surface, condensing the distillate upon a condensing surface which is located in close proximity to the vaporizing surface and maintaining a high vacuum in the space between the vaporizing and condensing surfaces during the distillation.

5. The process of distilling linseed oil and like unsaturated oils which deposits non-volatile residue during high vacuum thin film distillation which comprises, adding to the oil to be distilled an organic, freely flowing liquid which has a lower vapor pressure than the fraction to be separated and which is miscible with the oil to be distilled, subjecting this mixture to distillation by flowing it in the form of a thin film over a heated vaporizing surface, condensing the distillate upon a condensing surface which is located at a distance from the vaporizing surface of less than about the mean free path and maintaining a high vacuum in the space between the vaporizing and condensing surfaces during the distillation.

6. The process of distilling a vegetable or animal oil which deposits non-volatile residue during high vacuum distillation while in the form of a thin film which comprises, adding to the oil to be distilled an organic, freely flowing liquid which has a lower vapor pressure than the fraction to be separated and which is miscible with the substance to be distilled, subjecting this mixture to distillation by flowing it in the form of a thin film over a heated vaporizing surface, condensing the distillate upon a condensing surface which is located at a distance from the vaporizing surface of less than about the mean free path and maintaining a pressure of less than about .1 mm. of mercury in the space between the vaporizing and condensing surfaces during the distillation.

7. The process of distilling a liquid substance which contains no added solid matter and which deposits non-volatile viscous or solid residue during high vacuum thin film distillation which process comprises, adding to this liquid substance to be distilled an organic, freely flowing liquid which has a lower vapor pressure than the fraction to be separated and which is miscible with the liquid substance to be distilled, subjecting this mixture to distillation by flowing it in the form of a thin film over a vaporizing surface heated to a temperature of between about 70 and 250° C., condensing the distillate upon a condensing surface which is located at a distance from the vaporizing surface of less than about the mean free path, and maintaining a pressure of less than about .01 mm. of mercury in the space between the vaporizing and condensing surfaces during the distillation.

8. The process of concentrating fat soluble vitamins by distillation of a fish oil which deposits non-volatile residue during thin film, high vacuum distillation which comprises, adding to the oil an organic, freely flowing liquid which has a lower vapor pressure than the fraction to be separated and which is miscible with the oil, subjecting this mixture to distillation by flowing it in the form of a thin film over a vaporizing surface heated to a temperature of between 70° and 250° C., condensing the vaporized vitamin molecules upon a condensing surface which is located at a distance from the vaporizing surface of less than about the mean free path, and maintaining a pressure of less than about .01 mm. of mercury in the space between the vaporizing and condensing surfaces during the distillation.

KENNETH C. D. HICKMAN.